SELECTIVE BYTE ADDRESSABLE DATA TRANSLATION SYSTEM

Filed Dec. 14, 1965 2 Sheets-Sheet 1

INVENTORS
LEWIS E. KING
WILLIAM C. HOSKINSON
EUGENE J. ANNUNZIATA

BY John A. Harvey
ATTORNEY

SELECTIVE BYTE ADDRESSABLE DATA TRANSLATION SYSTEM

Filed Dec. 14, 1965 2 Sheets-Sheet 2

United States Patent Office 3,395,397

Patented July 30, 1968

3,395,397

SELECTIVE BYTE ADDRESSABLE DATA TRANSLATION SYSTEM

Lewis E. King, Highland, and William C. Hoskinson and Eugene J. Annunziata, Poughkeepsie, N.Y., assignors to International Business Machines Corporation, Armonk, N.Y., a corporation of New York Filed Dec. 14, 1965, Ser. No. 513,794
13 Claims. (Cl. 340—172.5)

ABSTRACT OF THE DISCLOSURE

The translation system employs a programmable mask to accomplish three types of data byte translation: (1) to gather continuous bytes from an input-output device and store them in non-contiguous byte locations within a word in storage, (2) to select non-contiguous bytes from a continuous input-output record and store them in non-contiguous byte locations within a word in storage, and (3) to write a continuous record from non-contiguous byte locations within a word in storage. Each operation starts with storage of a data word address, storage of the total count of the number of data bytes to be translated to or from storage, storage of the inter-word byte position at which the first byte translation is to occur, and storage of the byte mask. The first and second types of byte translation are accomplished in similar manner to the extent that the inter-word byte counter is successively stepped to select an inter-word byte position of a word assembly-disassembly register, into which the bytes of an incoming data word are inserted for storage, if that byte register position is not masked by the byte mask. For the first type of byte translation, the inter-word byte counter steps rapidly to halt for each byte translation at successive unmasked byte register storage positions; for the second type of byte translation, the inter-word byte counter simply steps once for each incoming byte translation. Upon completion of a full count by the inter-word counter, the contents of the word register is stored in a data word memory at the prestored word address which is then advanced and the total byte counter is decremented by the number of bytes in a word. The third type of byte translation is similar to the first type except that a word is placed in the assembly-disassembly register and the inter-word counter rapidly steps under control of the byte mask to select successive register positions from which successive bytes are written out. In all three types of byte translation, the translation operation halts when the total-byte counter is decremented to a zero count.

Figures 1, 2, 2A:
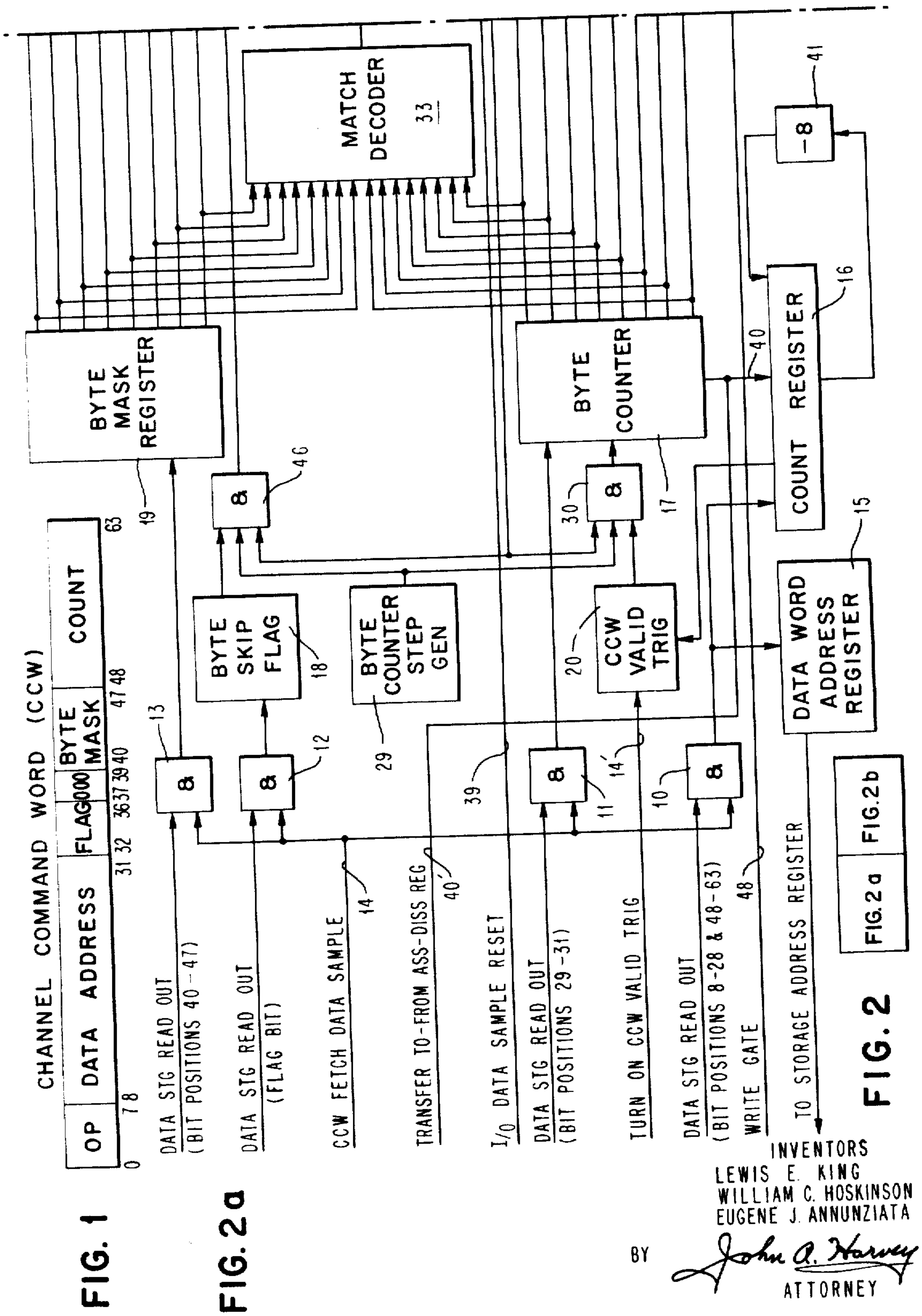

The present invention is an improvement on the Automatic Channel Apparatus of the King et al. pending application Ser. No. 357,369, filed Apr. 6, 1964, and assigned to the same assignee as the present application, which pending application is incorporated herein by this reference. The invention in particular relates to address controlled translation between input-output equipments and memory storage of binary-coded bits grouped into alphanumeric sets or "bytes" within a binary-coded word.

Data processing systems conventionally operate upon units of data of uniform size or quantity represented in coded form by binary-valued "bits" arranged in sets commonly called "bytes." For example, the conventional unit of data is comprised by a data "word" of a size selected according to the category of application to enable the highest data processing rates consistent with an economical limit which must be placed upon the size and complexity of the processing equipment components and intercoupling data translation channels required to store and process the word. Thus in the system disclosed in the King et al. application, a word includes a total of sixty-four bits (exclusive of eight parity bits) arranged into eight 8-bit bytes. The size selected for the data word conventionally establishes the same size, and thus the content, of program and associated control words used to control the individual data processing steps and the particular data processed at each step.

The data translation system of the King et al. application has the ability advantageously to address any byte position of a word, temporarily stored in a word storage register, to insert or abstract an information byte at that byte position. An additional number of information bytes may likewise be inserted in or abstracted from the word placed in the word register, but these must occupy register storage positions adjacent to each other and to the addressed byte position. This operational feature is particularly valuable in enabling data input equipments to update data previously stored in the memory storage unit of the processing equipment or to supply less than full word quantities of data from memory storage to output equipments, and in either event to permit this data translation to be accomplished by simple programming procedures which do not involve the central data processing unit. The latter thus is not required to expend valuable time in updating quantities of information in storage nor in overseeing or controlling data transfer between memory storage and the input-output equipments, and in being freed from such tasks accordingly is available for maximum utilization in performing other data processing functions without significant affect thereon of any such data transfers.

There are many applications where it is desirable to update data at scattered byte positions within a data word, or to abstract for output equipment use scattered bytes of data information within a data word. Such applications, for example, occur in the field of computer control of processes, in many types of business inventory controls, in creating data tables, or in the changing of the constants of a mathematical equation processed by a computer in attaining a graphical solution of the equation. While addressing of scattered byte locations of a data word may be accomplished by suitable programming of the system disclosed in the King et al. application, separate control words must be prepared by the programmer to attain this result. This not only is wasteful of the memory storage capacity used to store the plurality of control words required for random-access addressing, but undesirably increases the task and complexity of programming and in addition undesirably reduces the rate of data transfer between memory storage and the input-output equipments.

It is an object of the present invention to provide a new and improved system for selective byte gather-scatter addressing of word-size memory.

It is a further object of the invention to attain by a unitary automatic transfer operation the transfer of byte-size data information between selective scattered byte locations of a data word and input-output data equipments directly and without the need for intervening use of data processing equipment.

It is an additional object of the invention to provide an improved system for scattered byte addressing within a data word to enable byte-size data to be inserted into or abstracted from selective scattered byte locations of the word and to accomplish this in a plurality of data words while minimizing the time required for access to a large-capacity data storage memory unit.

It is yet a further object of the invention to provide a selective byte gather-scatter data translation system suitable for coupling data input-output equipments to the large-capacity data memory storage unit of a high speed data processing system, yet one operative at the relatively lower operating data transfer rate of conventional input-output equipments and effective to accomplish in a single programmed step and with minimized memory access time transfer of successive byte-size data between such equipments and selective scattered byte locations of each of plural data words received from or placed in or returned to memory storage.

Figure 2B:
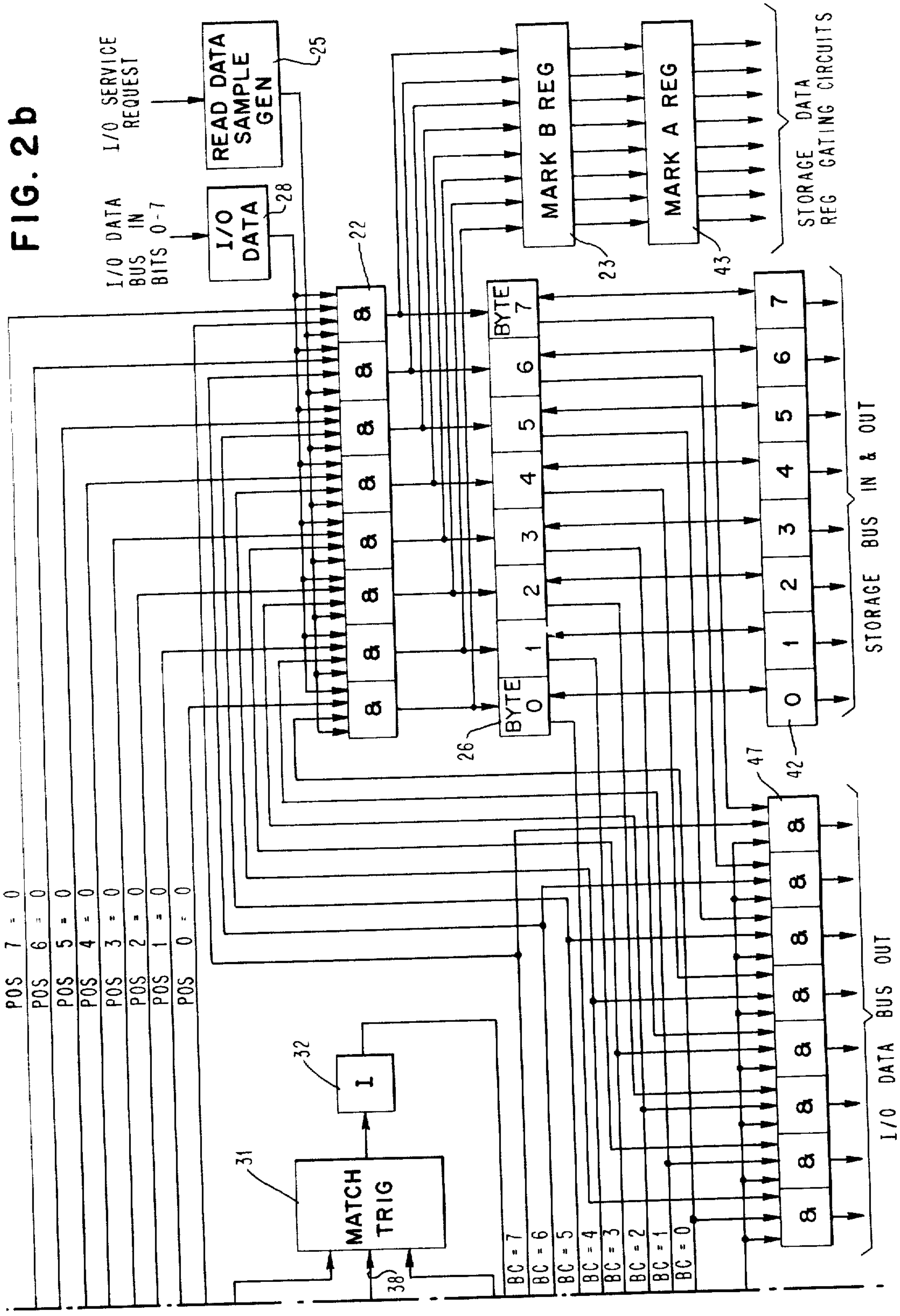

Other and further objects and advantages of the invention will appear as the detailed description thereof proceeds in the light of the drawings forming a part of this application and in which:

FIG. 1 illustrates the binary code format of a channel command word (CCW) used in partial control of a data translation system embodying the present invention; and FIGS. 2*a* and 2*b* arranged as in FIG. 2 show the electrical circuit arrangement of a selective byte addressable gather-scatter data translation system embodying the present invention in a particular form.

It is conventional to control data processing systems by use of program instruction words used alone or in conjunction with control words which, in relation to the translation of data between input-output data equipments and a memory storage unit, are often referred to as channel command words (CCW). A typical such command word has the binary format illustrated in FIG. 1, and includes an operational field comprised by bit positions 0–7 which specifies the operation to be performed (such as a read or write or control operation), a data address field which includes binary bit positions 8–31 specifying an 8-byte storage location in the main memory storage where a data word is to be stored or from which it is to be read, a flag field comprised by bit positions 32–36 which specifies operations supplemental to those of the principal operation performed, a buffer field which includes bit positions 37–39 which are spare flag positions, a byte mask field which includes bit positions 40–47 and provides interword byte addressing, and a count field comprising bit positions 48–63 which specifies the number of data bytes to be processed.

A selective byte addressable gather-scatter data translation system embodying the present invention includes various components interconnected in an electrical circuit arrangement as shown in FIGS. 2*a* and 2*b* arranged as in FIG. 2 which represents a form of the present system particularly useful for translating data words from and to a memory storage address while modifying the word data during such translation, or for translating one or more data words from data input equipment to specified address locations in memory storage, or for translating one or more data words from selectable addresses of memory storage to data output equipment. In performing these operations, the system operates under control of a channel command word of the type just described and enables three available types of data translation to be effected. The first of these is to gather bytes supplied continuously one after another from a data input equipment and to store the bytes in non-contiguous byte locations within a word in storage according to a programmable byte mask supplied by the channel command word. The second type of operation concerns the selection of non-contiguous bytes continuously supplied one after another by an input data device and to store such selected bytes in non-contiguous byte locations within a word in storage according to a programmable byte mask supplied to the channel command word. The third character of operation available enables the selection of successive data bytes from non-contiguous byte locations within a word in storage and the supply of the selected bytes continuously one after another to a data output device which is thereby enabled to write a continuous data record comprised by the selected data bytes.

The present system includes a plurality of AND gates 10, 11, 12 and 13 each having two input circuits. The selection of a program instruction word is conventionally accompanied by an automatic sequence which effects turn ON of a fetch trigger (not shown) to fetch a channel command word from memory storage and to generate a fetch data sample signal. The latter is applied through an input circuit 14 of the present system to condition concurrently one input circuit of each of the AND gates 10–13. This conditioning of the AND gate 10 enables it to translate to storage in a data word address storage register 15 the data address comprised by bit positions 8–28 of the channel command word, and to translate to a count register 16 the count comprised by bit positions 48–63 of the channel command word and thereby set the counter to specify the number of data bytes to be translated. The conditioning of the AND gate 11 enables it to translate to a byte counter 17 that portion of the data address comprised by bit positions 29–31 of the channel command word, these bit positions according to their content being effective to set the byte counter 17 either to a zero count or to an intermediate count enabling intermediate selection within a data word of the first byte thereof to be translated during the operation. The conditioning of the AND gate 12 permits a preselected flag bit if present of the channel command word to be placed in storage in a byte skip flag register 18 to attain a particular type of translation operation hereinafter described more fully. The conditioning of the AND gate 13 permits this gate to translate to storage in a byte mask register 19 bit positions 40–47 which comprise the programmable byte mask specified by the channel command word. A conventional memory cycle complete signal is "ANDED" and the CCW fetch trigger effectively to create and supply to an input circuit 14' a signal which turns ON a CCW valid trigger 20, which thereupon turns OFF the fetch trigger in conventional manner (not here considered for simplicity) to terminate the fetch data sample signal supplied to the input circuit 14.

The output circuits of both the byte counter 17 and the byte mask register 19 condition individual ones of a plurality of AND gate units 22 as shown. It will be understood that each of these AND gate units is actually comprised by eight data bit gates and a check bit gate which together translate the data bits and check bit of a coded data byte, and further includes a mark bit AND gate which is coupled to one of eight bit storage positions of a mark B register 23 corresponding to individual ones of the eight data bytes and used for a purpose presently to be explained. All of these AND gates which make up any one of the AND gate units 22 are conditioned in three manners. The first of these is by an I/O service request signal generated in conventional manner by a unit of data input equipment, when the latter has a data byte ready for storage, and translated through a service request input circuit 24 and a conventional read data sample generator 25 to one conditioning circuit of all AND gates of the given AND gate unit 22. The second and third conditioning of these AND gates are effected by one output circuit of the byte counter 17 and by one corresponding output circuit of the byte mask register 19. This conditioning is effected in such manner that lack of energization (binary 0) of the byte counter output circuit and lack of energization (binary 0) of the corresponding output circuit of the mask register condition (concurrently with their conditioning by the service request signal) the AND gates of the AND gate unit to translate to a corresponding byte position of an assembly-disassembly register 26 data byte bits supplied to individual ones of the gates through an input channel 27 and an I/O data unit 28 from the data input device which may, for example, be a magnetic tape or drum or disk reader or a tabulating card reader. At the same time, the service request signal supplied by the generator 25 is translated by the mark AND gate to storage in the mark B register 23 at a bit position thereof corresponding to the byte position of the particular AND gate unit 22 which effected translation of the data byte to the register 26.

The manner in which the AND gate units 22 are controlled in successive order to scatter successive incoming data bytes into scattered byte positions in the assembly-disassembly register 26 will now be considered under assumption that no bit is stored in the byte skip flag register 18 and that the byte counter is initially set to a zero count.

When the data translation operation is initiated, the byte counter 17 is made operative to initiate one or a succession of cycles of counter operation each controlled in a manner presently to be explained. This is accomplished by supplying to the counter 17 stepping pulses generated by a byte counter step generator 29 and supplied through an AND gate 30 conditioned for pulse translation by the now ON state of the valid trigger 20 and the OFF state of a match trigger 31 which supplies a conditional potential through an inverter 32.

The output circuits of the byte counter 17 and the output circuits of the byte mask register 19 are both connected to a match decoder 33 of conventional construction, such as one of the exclusive OR type. The match decoder 33 operates to compare the potentials in corresponding output circuits of the byte counter 17 and byte mask register 19 as the latter starts from its initial setting and thereafter is progressively advanced by stepping potential pulses supplied through the AND gate 30 from the stepping pulse generator 29 which generates a continuing succession of stepping pulses. If at any given count of the btye counter 17 the potential in the corresponding output circuit of the mask register 19 is masked (a binary 1 stored mask bit output potential), the match trigger 31 remains OFF and through the inverter 32 continues to condition the AND gate 30 to translate a further stepping pulse from the generator 29 to the byte counter 17 to advance the count of the latter. At the same time, the mask potential appearing in this output circuit of the mask register 19 prevents any data-byte translation conditioning of a corresponding AND gate unit 22. The stepping pulses of the generator 29 are generated at such high periodicity as rapidly to advance the count of the counter 17 in relation to the interval at which service request signals are supplied by the data input equipment to the input circuit 24. In particular, the periodicity of the stepping pulses generated by the generator 29 have a sufficiently high periodicity that, unless otherwise halted in a manner presently to be explained, the counter 17 can make a complete count of eight after the fetch data sample signal terminates in the input circuit 14 and before the first service request signal is applied to the input circuit 24 or likewise can make a complete count between successive such service request signals applied to the input circuit 24. However, when any prevailing count of the counter 17 in being matched by the match decoder 33 finds an unmasked potential (binary-0 stored mask bit potential) in a corresponding output circuit of the mask register 19, a potential is developed in the output circuit 38 of the decoder to turn the match trigger 31 ON. The ON state of the latter causes the inverter 32 to decondition the AND gate 30 for translation of further stepping pulses to the counter 17.

This halts the counter 17 at its then prevailing count, and it will be evident that the corresponding output circuits of both the counter 17 and mask register 19 condition one of the AND gate units 22 to translate the next incoming byte of data and a mark bit to those byte positions of the respective assembly disassembly register 26 and mark B register 23 which correspond to the byte position of the conditioned AND gate unit 22. Had the byte counter 17 been initially set through the AND gate 11 by the fetch data sample signal applied to the input circuit 14 at the initiation of the data translation operation, it normally would be so set that its initial count would be matched in the match decoder 33 with an unmasked output circuit of the mask register 19 (usually, but not necessarily on the first data word translation, with the lowest order byte position to be translated by the AND gate units 22) and by reason of this the resulting ON state of the match trigger 31 would prevent stepping of the counter 17 from its initial setting until after completion of a first data byte translation. If on the other hand the counter 17 was not initially so set, it would begin counting from an initial zero count until its count was halted by the lowest-order unmasked output potential of the mask register 19 in the manner just explained.

Upon completion of each data byte translation from the data input bus 27 through one of the AND gate units 22 to a corresponding byte position in the assembly-disassembly register 26 and concurrent storage of a mark bit in a corresponding storage position of the mark B register 23, the data input equipment generates and applies to a data sample reset input circuit 39 a reset signal which is effective to turn the match trigger 31 OFF. The inverter 32 thereupon once more conditions the AND gate 30 to translate stepping pulses from the generator 29 to the counter 17 which then proceeds to advance its count until halted, in the manner just previously described, by operation of the match decoder 33 in finding a further higher-order unmasked output circuit of the mask register 19 corresponding to the prevailing count of the counter. This further halted state of the counter 17 and the unmasked output circuit of the mask register 19 thereupon effect conditioning of a higher-order-position one of the AND gate units 22, whereby the next data byte supplied by the data input equipment through the data input bus 27 is translated through this conditioned AND gate unit to a corresponding byte position of the register 26 with corresponding positional storage of a mark bit in the register 23. It will accordingly be evident that by the controlled halting of the counter 17 according to unmasked output circuits (corresponding to stored binary 0 mask code bit) of the mask register 19, considered from lower to higher byte position orders, successive data bytes supplied from the data input equipment through the data input bus 27 are distributed to scattered byte positions in the assembly-disassembly register 26 with accompanying distribution of scattered mark bits to the register 23. Thus, for example, incoming data bytes may be distributed to scattered byte positions 0, 2, 3, 5 and 7 of the assembly-dissassembly register 26 and mark bits to the same positions of the register 23 by initially storing in the mask register 19 a byte mask effective to unmask the position 0, position 2, position 3, position 5 and position 7 output circuits of the latter.

Upon completion of a full count by the byte counter 17 and at the time its count steps from count No. 7 to count No. 0, an output circuit 40 of the counter 17 is energized to cause the count of the count register 16 to be reduced or decremented by a total of eight counts through operation of a conventional decrement unit 41. At the same time, the potential in the output circuit 40 of the counter 17 is supplied through an output circuit 40' to the data input equipment to effect a conventional data storage procedure involving the transfer of the contents of the assembly-disassembly register 26 to a buffer register 42 and the transfer of the contents of the mark B register 23 to a mark A register 43. Under control of the mark bits stored in the mark A register 43, the transfer operation last mentioned is followed by storage in the memory storage unit of the scattered data bytes stored in the buffer register 42 with regeneration in storage of those data byte positions of the data word other than the positions at which data bytes are stored in the buffer 42. Such data word storage occurs in the memory storage unit at an address thereof specified by the address stored in the address register 15, and the address in the register 15 is then advanced by unit value if the operation is to progress through one or more of a succession of data words. While this storage cycle is taking place, the byte counter 17 continues its counting operation until halted under control of the units 29–33 by attainment of a match between the prevailing count of the counter and the lowest-order-position unmasked output circuit of the byte mask register 19. The counter 17 is thus placed in readiness to effect proper distributional translation into the assembly-disassembly register 26 of the first data byte received from the data input equipment.

The foregoing described selective-mask-addressable data byte scatter translation of incoming data bytes into each of successive data words will continue until the read operation is halted in conventional manner by decrement of the count register 16 to a zero count. The latter thereupon turns OFF the CCW valid trigger 20 to decondition the AND gate 30 and leave the counter 17 halted at its zero count position.

When a skip flag bit is initially stored in byte skip flag register 18, non-contiguous data bytes are selected from a continuous supply of data bytes by the input equipment. As before, the selected data bytes are translated under byte mask control to scattered byte positions of the assembly-disassembly register 26. The system operation in this respect is similar to that previously described except that each OFF state of the match trigger 31 causes the inverter 32 not only to condition the AND gate 30 as before, to effect a step advance in the count of the counter 17, but in addition to condition an AND gate 46. The latter is also conditioned at this time by a skip flag bit stored in the byte skip flag register 17, and in being so conditioned translates a stepping pulse from the generator 29 to turn the match trigger 31 ON. This results in a single count advance of the byte counter 17 each time the match trigger 31 is turned OFF by a data sample reset signal generated in a conventional manner, as a result of the service request, and applied by the input data equipment to the input circuit 39 a brief interval after each data byte is read and made available at the data input bus 27 for translation into register storage. The match decoder 33 accordingly is no longer effective to control the progressive counter advance of the byte count 17. While the byte count 17 in effecting a progression of single counts conditions the AND gate units 22 successively in order from the lowest-order to the highest order byte position, and while the byte counter maintains each such AND gate unit so conditioned during the interval that an incoming data byte is supplied by the input equipment to the data input bus 27, no data byte translation to the assembly-disassembly register 26 occurs unless the particular counter-conditioned AND gate unit is concurrently conditioned by an unmasked output circuit of the byte mask register 19. The byte counter 17 thus distributably selects as before the byte positions of the assembly-disassembly register 26 into which a data byte may be translated for storage, but the byte mask stored in the byte mask register 19 makes the determinative selection whether a given incoming data byte shall or shall not be translated to the register 26. There is accordingly a selection made by the mask register 19 of just which contiguous and non-contiguous ones of the successive input data bytes shall be translated to the assembly-disassembly register 26 for storage, and there is a concurrent selection made by the byte counter 17 of the scatter distributional positions with which the selected data bytes are stored in the register 26.

The present system may also be operated to supply to a data output recorder a continuing succession of data bytes selected from non-contiguous byte positions within one or a succession of data words according to a programmable mask stored in the byte mask register 19. In this form of system write operation, the fetch trigger (not shown) turns ON the CCW valid trigger as earlier described and applies a data sample signal to the input circuit 14 which causes the count register 16 and the byte counter 17 to be set as before, effects storage in the address register 15 of the address of the first data word to be selected from memory storage, and effects storage of the byte mask in the byte mask register 19. For this form of system operation, no flag bit is stored in the byte skip flag register 18. A data word is then read in conventional manner from memory storage, at the address thereof corresponding to the address in the address register 15 (which address is then advanced by unit value in the latter register), and is translated through temporary storage in the buffer storage register 42 to storage in the assembly-disassembly register 26. Under control of the units 29–33 and in the manner previously described, the byte counter 17 rapidly advances its count and is halted upon attaining a match between its prevailing count and the lowest-order-position unmasked output circuit of the mask register 19. This halted position of the byte counter causes one of its output circuits to condition a corresponding one of a plurality of write AND gate units 47. This counter-conditioned AND gate unit becomes fully conditioned by a write gate signal which is supplied by the data output recording equipment to a write gate control circuit 48 at the time the output equipment is ready to receive a first data byte. This full conditioning of this AND gate unit causes a data byte to be translated from a corresponding byte position of the assembly-disassembly register 26 through the conditioned AND gate unit and the data output bus to the output data recording equipment. Upon receipt of the data byte, the data output equipment generates in conventional manner and supplies to the data sample reset circuit 39 a reset signal which is effective to turn the match trigger 31 OFF. This permits a further rapid count advance by the byte counter 17 until it is again halted by turn ON of the match trigger 31 in response to attainment of match with the next higher-order-position unmasked output circuit of the mask register 19. This new count of the halted byte counter conditions a corresponding higher-order-position AND gate unit 47 to respond to the write signal supplied to the control circuit 48 and thereby translate to the data output equipment further data byte selected from a corresponding byte position of the assembly-disassembly register 26.

This selective translation of selective scattered data bytes from the assembly-disassembly register 26 continues until the byte counter 17 eventually completes a count cycle and advances from a count of seven to a zero count. Such advance energizes the output circuit 40 of the byte counter as before to effect decrement of the count register 16 by a count of eight and to energize the output circuit 40', but energization of the latter circuit in this instance causes transfer into storage in the assembly-disassembly register 26 of a further data word selected from memory storage at the address thereof specified by the advanced address in the register 15. The write operation continues in the manner described until halted in conventional manner by decrement of the count register 16 to a zero count thereof with concurrent turn OFF of the trigger 20. It will thus be evident that the system operation, under control of the byte mask stored in the byte mask register 19, effects selective gathering of non-contiguous data bytes from one or a succession of data words placed in the assembly-disassembly register 26 and the supply of these gathered bytes in continuous manner one after another to the data output equipment.

It will be evident from the foregoing description of the invention that a data translation system embodying the invention provides selective byte gather-scatter addressing of a word-size memory storage device, and accomplishes this by a unitary automatic transfer character of operation directly and without the need for intervening use of data processing equipment. The invention has the further important advantage that it enables byte-size data to be inserted into or abstracted from selective scattered byte locations of a data word, or a succession of data words, while minimizing the time required for access to a large-capacity data storage memory unit in which the data word or words is or are stored. A data translation system embodying the present invention is suitable for coupling data input-output equipments to the large-capacity data memory storage unit of a high speed data processing system, yet is one which operates at the relatively lower operating data transfer rate of the input-output equipments and is effective to accomplish in a single programmed operation and with minimized memory access time the transfer of successive byte-size data between such equipments and selective scattered byte locations in each of plural data words received from or placed into memory storage.

While a specific form of the invention has been described for purposes of illustration, it is contemplated that numerous changes may be made without departing from the spirit of the invention.

What is claimed is:

1. A selective byte addressable data translation system comprising word storage means having data-byte storage positions for storing individual bytes of a data word, mask storage means for storing byte mask code bits collectively defining selective byte storage positions of said word storage means, a data-byte channel, and translating means responsive to the byte mask code bits stored in said mask storage means for effecting translation of successive data bytes between said data-byte channel and successive ones of said selective byte positions of said word storage means.

2. A data translation system according to claim 1 in which said mask storage means includes individual byte mask code bit storage positions permitting byte mask code bits in preselected order of storage positions to define at least one non-contiguous scatter of said selective byte storage positions in said word storage means.

3. A data translation system according to claim 1 in which said translating means includes means for providing a progressive count corresponding in total value to the number of byte storage positions in said word storage means, and means jointly responsive to the byte mask code bits stored in said mask storage means and to the prevailing count of said counting means for effecting said translation of successive data bytes between said data-byte channel and successive ones of said selective byte positions of said word storage means.

4. A data translation system according to claim 1 in which said mask storage means has ordered bit storage positions for storing individual ones of said mask code bits in preselected order, and in which said translating means is responsive to the successive mask code bits in said preselected order to effect said selective-byte position translation of successive data bytes.

5. A data translation system according to claim 4 in which each of said mask code bits corresponds to an individual byte-storage position of said word storage means and each said mask code bit has either of two binary values, one non-selective of the individual data byte storage position and the other selective of the individual data byte storage position, and in which said translating means includes translation control means responsive to said one and said other values of said mask code bits for effecting said selective-byte position translation of successive data bytes.

6. A data translation system according to claim 4 in which said word storage means has ordered data byte storage positions for storing individual bytes of a data word in preselected order and said preselected order of storage of mask code bits corresponds to said preselected order of storage of data bytes, and in which said translation means includes translation control means responsive to said mask code bits in said preselected order thereof for effecting selective-byte position translation of successive data bytes between said channel and said ordered data byte storage positions of said storage means.

7. A data translation system according to claim 5 in which said translating means includes selector means for controlling said translation control means to effect response thereof to said mask code bits successively in said preselected order of storage thereof in said mask storage means and select successive ones of plural byte storage positions of said word storage means.

8. A data translation system according to claim 5 in which said translating means includes selector means for enabling selection in preselected order of successive byte storage positions of said word storage means to effect under mask-bit control said selective-byte position translation of successive data bytes.

9. A data translation system according to claim 5 in which said translating means includes counting means having an automatic count advance respectively permitted and halted by said one and said other binary values of said mask code bits in said preselected order of storage thereof in said mask storage means, and in which said translation control means is responsive to the prevailing count of said counting means for effecting said selective-byte positional translation of successive data bytes.

10. A data translation system according to claim 9 in which said translation control means is comprised by a plurality of translational byte gate units which control the translation of data bytes to or from individual byte storage positions of said word storage means.

11. A data translation system according to claim 9 in which said translation control means includes a plurality of translational byte gate units each jointly responsive to an individual count of said counting means and to the binary values of individual mask code bits stored in said mask storage means for effecting said selective-byte positional translation of successive data bytes.

12. A data translation system according to claim 11 in which said translational control means is comprised by a plurality of translational byte gate units which control the translation of data bytes to individual storage positions of said word storage means.

13. A data translation system according to claim 9 which includes automatic count advance means for advancing the count of said counting means at a rate higher than a preselected repetition rate of data-byte translation interval, and means controlled by the prevailing count of said counting means and responsive to said one and said other binary values of said mask code bits in said preselected order of said storage thereof in said mask storage means for respectively permitting during the interval between data-byte translation intervals and halting during each data of byte interval the count advance of said counting means by said advance means.

References Cited

UNITED STATES PATENTS

| | | | |
|---|---|---|---|
| 3,161,763 | 12/1964 | Glaser | 235—157 |
| 3,238,510 | 3/1966 | Ergott | 340—172.5 |
| 3,251,037 | 5/1966 | Coil et al. | 340—172.5 |
| 3,343,134 | 9/1967 | Foulger et al. | 340—172.5 |

ROBERT C. BAILEY, *Primary Examiner.*

R. B. ZACHE, *Assistant Examiner.*